S. G. STANNARD.
VEHICLE ELEVATOR.
APPLICATION FILED JAN. 3, 1916.

1,220,702.

Patented Mar. 27, 1917.
2 SHEETS—SHEET 1.

Witnesses:

Inventor
S. Grant Stannard
By Frederick W. Lyon, atty.

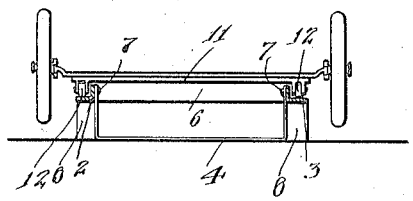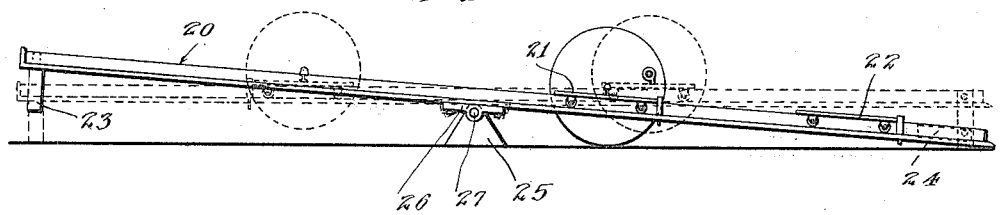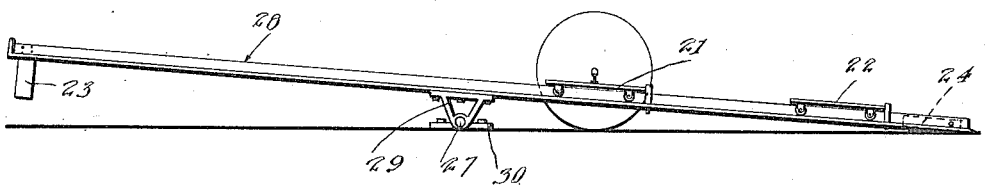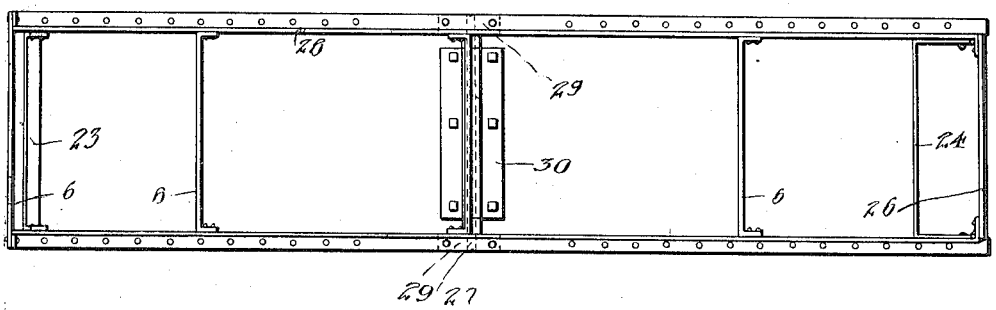

UNITED STATES PATENT OFFICE.

S. GRANT STANNARD, OF LONG BEACH, CALIFORNIA.

VEHICLE-ELEVATOR.

1,220,702.  Specification of Letters Patent.  Patented Mar. 27, 1917.

Application filed January 3, 1916. Serial No. 69,757.

*To all whom it may concern:*

Be it known that I, S. GRANT STANNARD, a citizen of the United States, residing at Long Beach, in the county of Los Angeles and State of California, have invented a new and useful Vehicle-Elevator, of which the following is a specification.

This invention relates to a vehicle elevator and the primary object is to provide means upon which an automobile or other vehicle having pneumatic tires may be supported independent of the wheels in spaced relation to the ground in order that strain on the tires, wheels and wheel bearings will be eliminated.

An important object is to provide an elevator of the character described which will be automatic in operation and operate when a vehicle which it is to elevate is driven into coöperative relation thereto and without requiring the driver to get out of the vehicle.

Another object of this invention is to provide a simply constructed device of the character described which may be manufactured cheaply, will prove reliable and efficient in operation and which will take up very little room.

Other objects and advantages will appear from the subjoined detail description.

The accompanying drawings illustrate the invention.

Fig. 6 is a sectional view of the elevator showing the wheels and axle of a vehicle thereon;

Fig. 7 is a side elevation of a modified form of elevator showing it in operative and inoperative positions;

Fig. 8 is a side elevation of another modified form of elevator; and

Fig. 9 is a top plan view of the form shown in Fig. 8.

Figure 1:
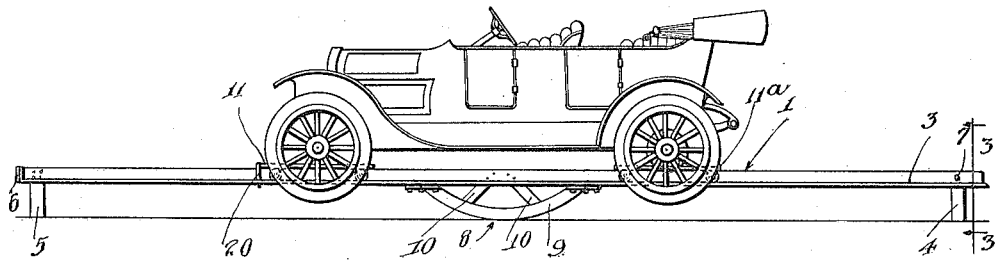
Figure 1 is a side elevation of the elevator showing it as it would appear when in use.
Figure 2:
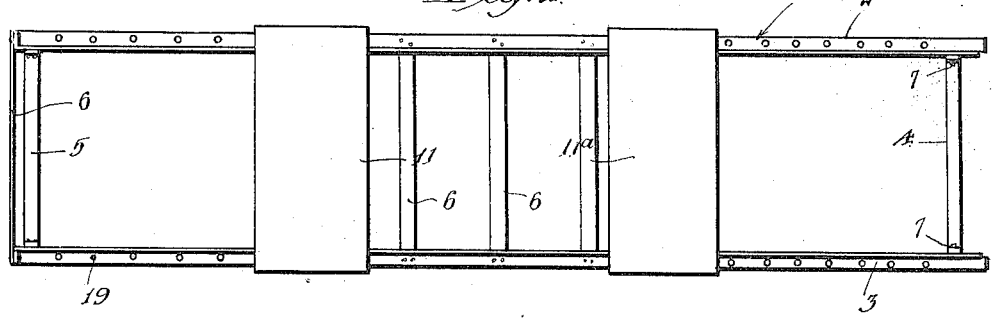
Fig. 2 is a top plan view of the elevator.

Referring to the drawings, 1 designates a rocking frame which consists of spaced parallel angle bar tracks 2 and 3 which are connected with one another adjacent to their ends by U-shaped standards or supports 4 and 5 and by transverse angle bars 6 secured to the bars 2 and 3. The horizontal portion of the U-shaped supports or standards 4 and 5 are designed to rest upon the ground or surface supporting the device and the standard 4 is pivoted as at 7 to the bars 3 and 4, whereas the standard 5 is fixed to said bars.

The frame 1 is provided with a fulcrum generally designated 8 and located intermediate and preferably centrally of the ends thereof. This fulcrum 8 comprises curved rockers 9 secured at their ends to the respective bars 2 and 3 and provided with bracing rods or strips 10 secured to the bars 2 and 3 and rockers 9 respectively. Any other construction not shown which will provide a fulcrum so that the frame will rock, may be provided.

Carriages 11 and 11ª are slidably mounted upon the frame 1, said carriages being provided with rollers 12 which engage and ride upon the horizontal portions of the angle bar tracks 2 and 3. These carriages are relatively wide and designed to engage the front axle and rear axles of the vehicle.

In adapting a motor vehicle for coöperation with the elevator preferably there is provided carriage-engaging means 13 secured to and depending from the rear axle 14 of the vehicle. This means comprises a horizontal bar 15 secured by hangers 16 to the axle 14. The differential housing 17 on the rear axle may be provided with lugs 18 which are secured to the bar 15 in any suitable manner to give the bar more rigidity.

The angle bar tracks 2 and 3 are provided in their horizontal portions with a plurality of spaced openings 19 into any of which may be inserted stop pins 20. These pins are for the purpose of holding the carriages 11 and 11ª in such position that they will be engaged by and operate to support the front and rear axles of the vehicle. These pins may also be used to limit the movement of the carriages 11 on the frame when the vehicle is being moved into position to be elevated.

Figure 3:
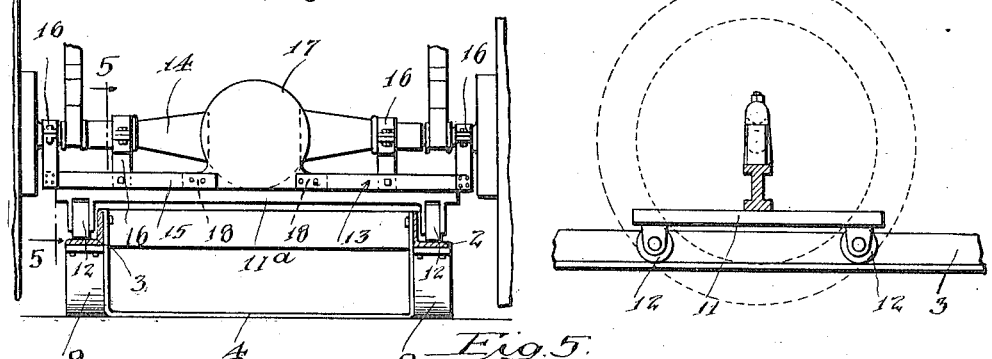
Fig. 3 is a transverse sectional view taken on line 3—3 of Fig. 1.
Figure 4:
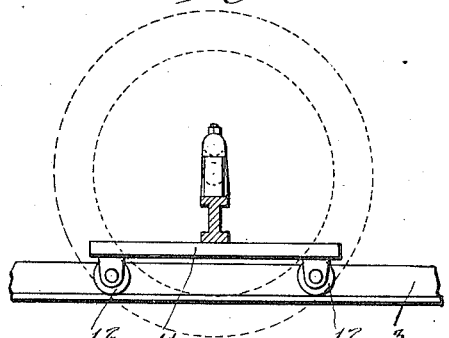
Fig. 4 is a fragmentary side elevation of the elevator showing the front axle of a vehicle thereon and in section.
Figure 5:
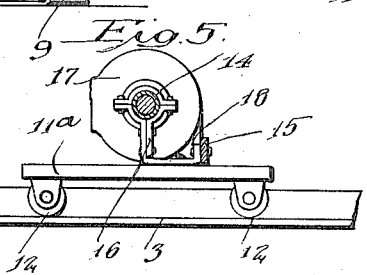
Fig. 5 is a cross sectional view taken on line 5—5 of Fig. 3.

In operation, the frame is inclined toward the end to which the pivoted standard 4 is secured and said end rests upon the floor or other surface supporting the device, the opposite end together with the standard 5 being spaced from the floor or other surface, as shown in dotted lines in Fig. 7 of the drawings. The vehicle to be elevated is run toward and over the lower end of the frame and straddles the frame as indicated in Fig. 3 in the drawings. As the vehicle advances over the frame, the front axle A thereof slides over and engages the carriage 11 which is held in an inclined position against stop pins 20 and further movement of the vehicle causes the front end thereof to be elevated from the ground or other surface. When the forward part of the vehicle is moved past the center of the frame the latter will become over-balanced and the lower end thereof will move upwardly so that the carriage 11ª will engage with the bar 15 of the means 13 and further movement of the vehicle results in the disposal of the greater part of the weight upon the frame in such manner that the rear wheels of the vehicle will be lifted from contact with the ground or other surface, as shown in Fig. 1. The standard 4 swings into upright position and the standard 5 contacts with the ground or other surface so that the frame is supported at the center and ends thereof.

The carriages 11 and 11ª are set in the desired positions to coöperate with the front and rear axles of the vehicle and are held by the pins 20. It will be seen that elevators of this type may be used to great advantage in garages and like places where automobiles and other vehicles are stored. When it is desired to remove the vehicle from the frame the standard 4 is moved out of supporting position in any suitable manner and a slight backward movement of the vehicle is sufficient to over-balance the frame and cause the rear end thereof to contact with the floor. The vehicle may be then rolled into contact with the ground or other surface, with ease. When the vehicle is supported in elevated position, the frame is balanced, thus in letting the frame down into inclined position no shock or jar need be occasioned.

Referring to Fig. 7 wherein I have illustrated a modified form of elevator, 20 designates a rocking frame identical as to construction with the frame 1. Carriages 21 and 22 are mounted on the frame 20 and standards 23 and 24 identical with the standards 4 and 5 are secured to the ends of the frame. In this form of my invention instead of providing curved rockers, I preferably employ an angular bearing 25 which is mounted upon the ground or other surface and coöperates with a bearing 26 secured to the frame centrally of the ends thereof. A bolt 27 is extended through the bearings 25 and 26 and acts as a pivot for the frame to rock upon. The operation of this type of elevator is the same as in the preferred form, and this construction is preferable in cases where the elevator is to be permanently attached to the floor or other surface.

Figs. 8 and 9 illustrate another modified form of my invention and this form is greatly similar to the one illustrated in Fig. 7 of the drawings, the frame 28 being provided with a depending angular bearing 29 carried intermediate and preferably centrally of the ends thereof. A bearing 30 secured to the floor or other surface and being relatively long, coöperates with the bearing 29 and a bolt 30 is inserted through the bearings in a manner similar to the bolt 27. These modified forms shown in Figs. 7, 8 and 9 illustrate some of the various means which may be provided as a fulcrum for the frame.

With reference to the foregoing description and accompanying drawings, it will be seen that I have provided a vehicle elevator and tire saver which may be portable or permanently attached as desired and will operate in a reliable and effective manner.

It is understood that the invention is not limited to the exact construction shown in the drawings and described above, but that deviations therefrom may be made within the spirit and scope of the invention.

I claim:

In combination with a vehicle and a bar carried below and parallel to the rear axle thereof, of a frame fulcrumed intermediate its ends, supporting means at the ends of the frame, and carriages slidable upon the frame adapted for engagement with the front axle of the vehicle and the bar on the rear axle thereof respectively.

Signed at Los Angeles, California, this 16th day of December, 1915.

S. GRANT STANNARD.

Witnesses:
CHAS. J. CHUNN,
L. BELLE WEAVER.

Copies of this patent may be obtained for five cents each, by addressing the "Commissioner of Patents, Washington, D. C."